United States Patent [19]

Golob et al.

[11] Patent Number: 4,877,191
[45] Date of Patent: Oct. 31, 1989

[54] SHREDDING OR SLICING TOOL ARRANGEMENT FOR CUTTING FOOD MATERIAL, IN PARTICULAR FOR FOOD PROCESSORS

[75] Inventors: Jürgen Golob, Friedrichsdorf; Wolfgang Franke, Langen, both of Fed. Rep. of Germany

[73] Assignee: Braun Aktiengesellschaft, Kronberg, Fed. Rep. of Germany

[21] Appl. No.: 198,788

[22] Filed: May 25, 1988

[30] Foreign Application Priority Data

Jun. 4, 1987 [DE] Fed. Rep. of Germany ....... 3718728

[51] Int. Cl.$^4$ .............................................. B02C 18/18
[52] U.S. Cl. ...................................... 241/92; 241/286
[58] Field of Search .................... 241/92, 282.1, 282.2, 241/286

[56] References Cited

U.S. PATENT DOCUMENTS 4,560,111 12/1985 Cavalli .................................. 241/92

FOREIGN PATENT DOCUMENTS 100755 7/1983 European Pat. Off. .
3020242 12/1981 Fed. Rep. of Germany .
2076638 2/1984 United Kingdom .

Primary Examiner—Mark Rosenbaum
Attorney, Agent, or Firm—Fish & Richardson

[57] ABSTRACT

An adjusting device (74) is fixedly and rotatably mounted in axial longitudinal direction on a shaft coupling (22) while being at the same time connected with a disk (24) via an adjustment means (92, 94). Both the shaft coupling (22) and the disk (24) are each in engagement with a shredding or slicing tool (28, 80, 82, 84) via an elongated toothed member (42, 44 and 50, 52) cooperating therewith. The shredding or slicing tool (28, 80, 82, 84) bears against the drive shaft (18) in axial direction and is held in a fixed position relative to the drive shaft (18).

11 Claims, 4 Drawing Sheets

SHREDDING OR SLICING TOOL ARRANGEMENT FOR CUTTING FOOD MATERIAL, IN PARTICULAR FOR FOOD PROCESSORS

This invention relates to a shredding or slicing tool arrangement for cutting food material, in particular for domestic appliances, which arrangement is adapted to be fitted in a non-rotatable relationship to a drive shaft extending through the bottom of a bowl by means of a shaft coupling, and which is comprised of a disk dividing the bowl into an upper and a lower bowl section, a shredding or slicing tool provided in an opening of the disk, and an adjusting device for adjustment of the distance of the disk relative to the shredding or slicing tool.

A cutting blade arrangement for a food processing apparatus with a shaft coupling is already known (DE-OS No. 30 20 242) which is adapted to be seated on the shaft end of the motor drive shaft from above and which can be set to a range of cutting thicknesses by means of an adjusting device featuring a rotary connection. In the use of exchangeable shredding or grating disks, however, the possibility of infinitely varying the setting does not ensure a uniform spacing, making the known cutting tool arrangement with its associated adjusting device unsuitable for universal use. Another disadvantage is the difficulty of exchanging the blade for other cutting tools as, for example, a french-fry cutter. This would necessitate complicated procedures for installation and removal which can hardly be expected from the operator of such a device.

By contrast, it is an object of the present invention to devise a shredding or slicing tool arrangement in which a variety of tools can be exchanged simply and within a minimum of time while at the same time permitting the cutting thickness to be varied.

This object is accomplished by the present invention in that the adjusting device is fixedly and rotatably mounted on the shaft coupling in axial longitudinal direction while at the same time being connected with the disk via an adjustment means, that both the shaft coupling and the disk are each in engagement with the shredding or slicing tool via an elongated toothed member cooperating therewith, and that the shredding or slicing tool bears against the drive shaft in axial direction and is held in a fixed position relative to the drive shaft.

By configuring the shredding or slicing tool separately from the shaft coupling, the disk and the adjusting device, it is possible to exchange the shredding or slicing tool quickly, the tool being in relatively non-rotatable engagement with the disk and the shaft coupling via an elongated toothed member only in assembled condition, otherwise being readily removable in upward direction with the cover removed without affecting the remaining components.

On account of the advantageous use of a shaft coupling, it is also possible without difficulty to seat the entire cutting device from above on the shaft drivable by the motor and to set it to a range of cutting thicknesses by means of the adjusting device, because the disk is movable in axial direction simply by turning the adjusting device while the cutting tool will always maintain its position once mounted. Using a french-fry disk, it is also possible to produce french fries of varying thicknesses in a simple manner because the adjusting device permits the cutting device to be set to the desired cutting thickness within a minimum of time while on the other hand permitting a quick change from a slicing blade to a french-fry cutting tool.

If, for example, the slicing tool is to be exchanged for another tool, for example, a shredding tool, in an improvement of the invention a locking device is provided between the disk and the shredding tool, which secures the shredding tool axially relative to the disk, and the shaft coupling is displaced axially as the adjusting device is turned. In this arrangement, the slicing tool can be readily removed in upward direction to be exchanged for a shredding tool, for example. Employing the shredding tool, the advantageous use of the locking device then permits the cutting thickness to be maintained constant, even if the adjusting device is operated. Where shredding disks are used, operation of the adjusting device thus has no effect on the adjustment of the cutting thickness, that is, the adjustment of the disk, because the shaft coupling, in conjunction with the adjusting device, will then be displaced axially relative to and on the disk when the shredding tool is fixed in position on the disk by means of the locking device.

Advantageously, the adjusting device is centered on the circumferential outer surface of the shaft coupling, and an annular torus engaging into an annular groove provided on the shaft coupling is formed on the adjusting device. The shaft coupling is thereby secured against axial displacement on the adjusting device. The adjusting device being clipped onto the shaft coupling, it is nearly inseparably connected therewith. It is to be understood that other fastening means known from the prior art may be used, including, for example, a circlip. In the use of adjustable slicing tools, this method of mounting or supporting the adjusting device on the shaft coupling ensures that the disk is displaced axially relative to the tool as the adjusting device is turned, whereby the spacing between the slicing tool and the disk is varied, and the shaft coupling bears against the free end of the drive shaft. When a shredding tool is substituted for the slicing tool, axial securement of the disk relative to the shredding tool by means of the locking device ensures that turning of the adjusting device causes only the shaft coupling with the adjusting device to be displaced axially upwardly or downwardly, depending on the direction of rotation, whereas the disk remains non-displaceable relative to the shredding tool.

In a further improvement of the invention, the adjusting device has a locking ring secured thereto which is provided with at least one radially inwardly extending nose engaging into a recess extending axially on the disk, and the length of the axially extending recess corresponds to the maximum amount of axial displacement of the disk. This arrangement reliably prevents the adjusting device from being unscrewed from the disk. It further eliminates the possibility of the slicing tool entering the opening of the feed tube provided on the cover, which would inevitably damage the cover.

Advantageously, the adjusting device is comprised of a cylindrical inner portion and a relatively spaced cylindrical outer portion, and the annular space formed between the cylindrical portions serves the function of receiving axially slidably a cylindrical flange formed on the disk. This enables the cylindrical flange on the disk to enter easily the annular space formed between the two cylindrical portions as the adjusting device is turned. This arrangement further provides a highly stable guiding and centering of the disk on the adjusting device, in spite of axial displacement of the disk. It is an advantage herein that the circumferential outer surface of the cylindrical inner portion is provided with a thread which cooperates with a thread formed on the circumferential inner surface of a cylindrical flange provided on the disk. The manufacture of such a thread in the annular space is particularly easy if the adjusting device is a injection-molded plastics part.

In a further advantageous embodiment of the invention, the shaft coupling has at its driving end a polygonal bore which is adapted for seating engagement with the upper end of the drive shaft provided with a corresponding polygon, the shaft coupling having at its opposite end on the circumferential outer surface an elongated toothed member which is engagement with a corresponding elongated toothed member formed on a cylindrical flange on the shredding or slicing tool and permits an axial displacement of the shredding or slicing tool relative to the shaft coupling. In spite of the existence of a relatively non-rotatable connection, a slightly axially displaceable connecting relationship is obtained between the shaft coupling, the drive shaft of the motor and the shredding or slicing tool. This arrangement affords a particularly ready exchange of the shredding or slicing tool. The elongated toothed member serves at the same time the function of centering the shredding or slicing tool in its lower section when the shredding or slicing tool arrangement is not mounted in the bowl.

In order to be able to infinitely vary the spacing between the disk and the slicing tool, the slicing tool advantageously has an elongated opening which extends in the axial direction of the pin and which is engaged by a locking pawl of the locking device formed in the disk and displaceable against the action of a spring element, with the length of the axially extending elongated opening corresponding to the maximum amount of displacement of the disk. The length of the elongated opening determines whether the clearance between the cutting edge and the surface of the circular disk is adjustable and if so, to what amount. In the use of a shredding tool in which setting of the shredding tool to varying distances relative to the disk surface is undesired, an improvement of the invention provides for the elongated opening to be formed by a recess whose axial length is dimensioned such that the locking pawl engages thereinto axially without clearance. This prevents the shredding tool from being displaced relative to the disk even if the adjusting device is turned, because in this event the arrangement of the invention provides for raising or lowering of the adjusting device together with the shaft coupling relative to the disk. Accordingly, as soon as the disk is fixedly located in position relative to a tool in axial longitudinal direction of the drive shaft, an axial displacement of the disk relative to the tool is no longer possible.

To ensure that the shredding or slicing tool is at all times mounted in an axially fixed position relative to the drive shaft, while being locked against rotation relative to the disk, the adjusting device and the shaft coupling, in a further improvement of the invention the shredding or slicing tool has a shaft extending through its center in positive engagement with the shredding or slicing tool, the shaft being limited in its axial movement between a cover adapted to close the bowl and the upper end of the drive shaft when the shredding or slicing tool arrangement is installed inside the bowl. For greater ease of manufacture, the mounting structure provided with the cylindrical flange is injection-molded to the metal cutter carrier and the shaft, whereby a positive engagement of the shredding or slicing tool thus formed is obtained.

In order to obtain a particularly good mounting of the shredding or slicing tool independently of the disk in the bowl, a bearing sleeve secured in the cover is provided at one end, into which sleeve the end of the shaft proximate to the cover engages, while at the other end a central bore is provided in the shaft coupling to rotatably carry the driving end of the shaft. Accordingly, the shaft coupling which is centered on the drive shaft supports the shredding or slicing tool on the one hand and, independently thereof, the disk with the adjusting device on the other hand.

The invention will be described in more detail in the following with reference to the accompanying drawings illustrating two embodiments thereof. In the drawings, FIG. 1 is a perspective view of a shredding or slicing tool arrangement o the invention for a domestic appliance featuring a variety of shredding and slicing tools adapted to be optionally mounted on a disk, as well as a cover with a bowl in which the shredding or slicing tool arrangement is adapted to be installed;

To avoid repetitions, like parts have been assigned like reference numerals throughout FIGS. 1 to 4.

Figure 1:
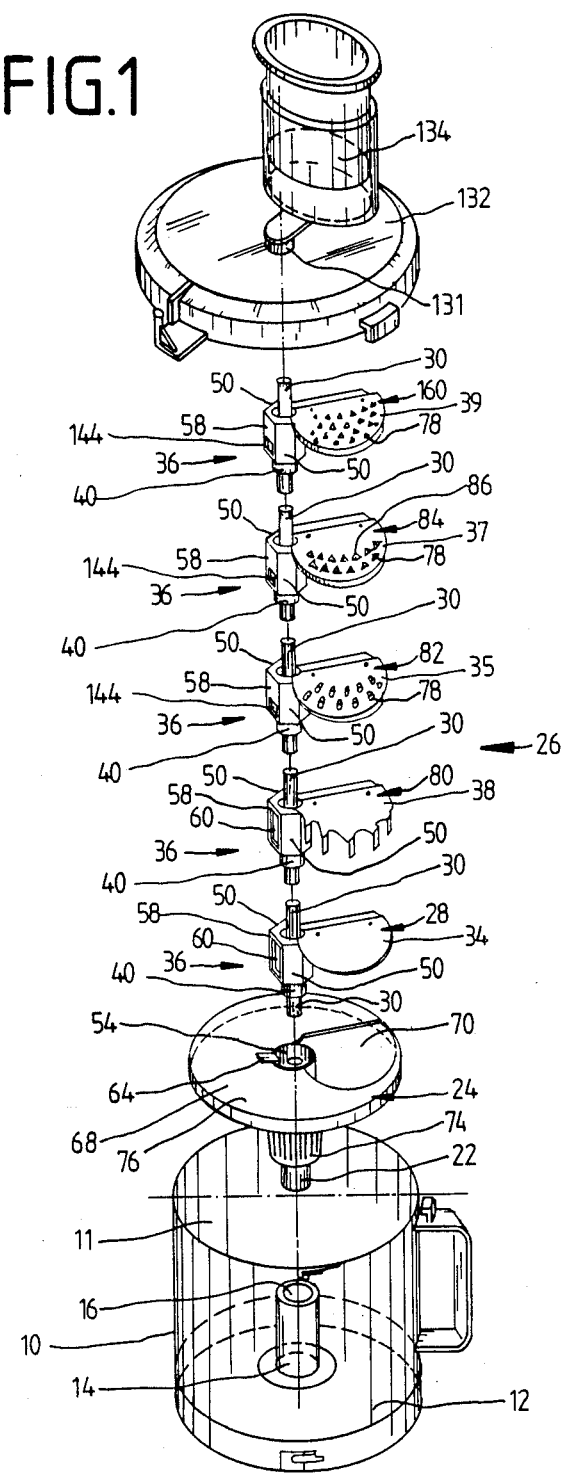
Figure 2:
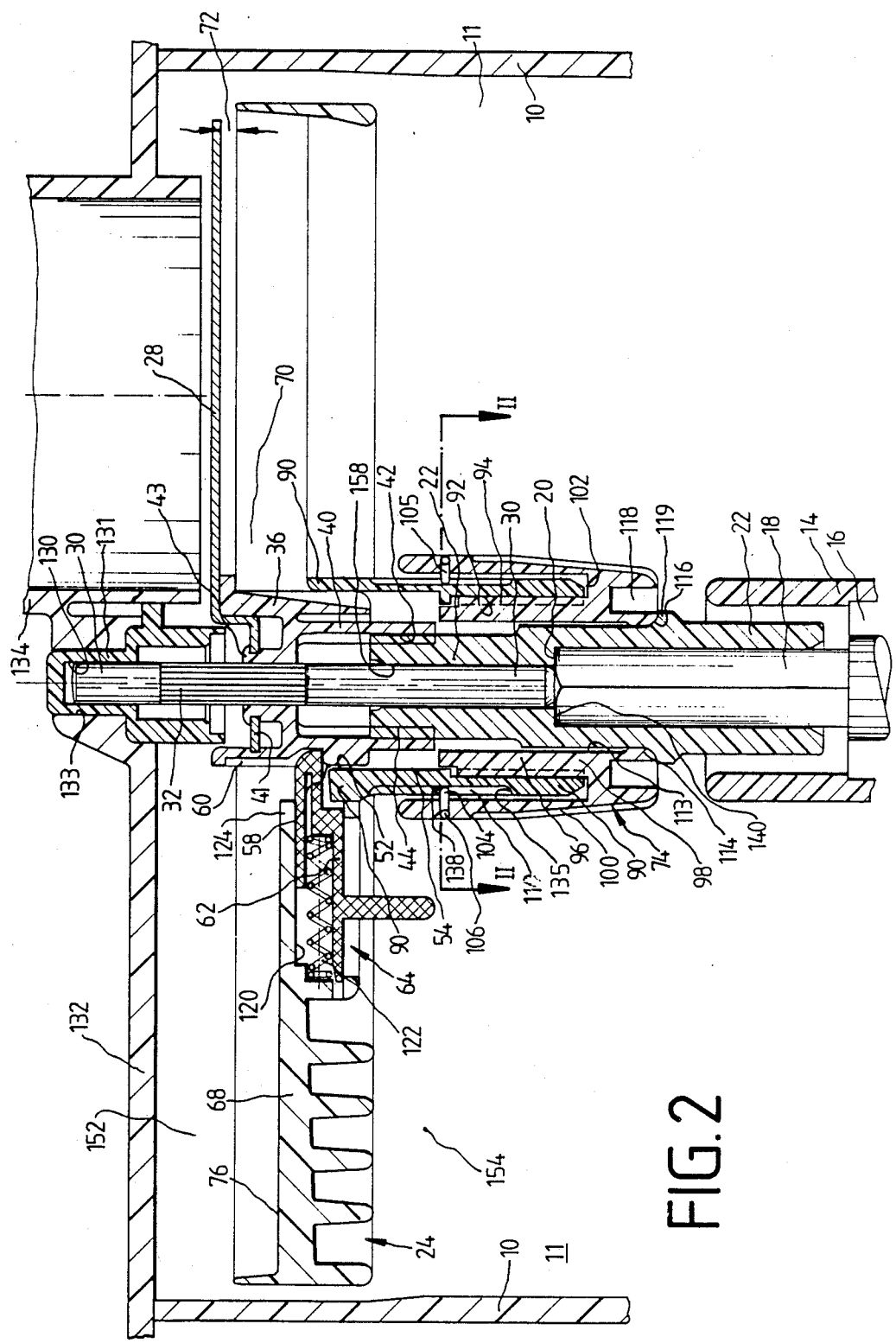
FIG. 2 is a longitudinal section through a slicing tool arrangement including an adjusting device for varying the relative distance of the disk to the slicing tool.
Figure 3:
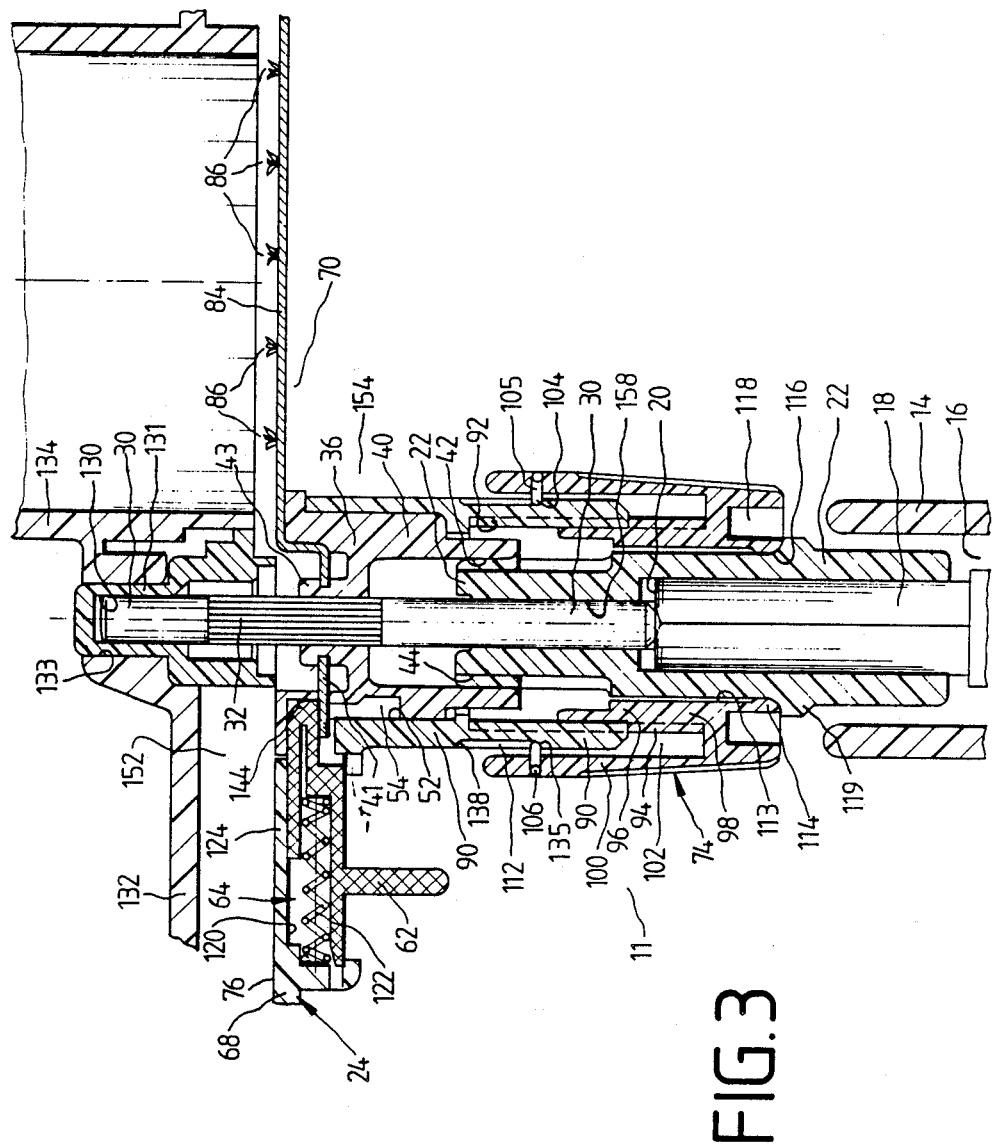
FIG. 3 is a longitudinal section through a shredding tool arrangement in which a shredding tool axially secured to the disk via a locking device has been substituted for the slicing tool of FIG. 2.

In FIGS. 1 to 3, reference numeral 10 identifies a bowl having formed on its bottom 12 a cylindrical stem 14 which projects into the bowl interior space 11 and includes a bore 16 through which the end of a drive shaft 18 adapted to be driven by a motor, not shown in the drawings, extends from outside into the lower bowl section 154. The shaft 18 has a shaft end 20 configured as a polygonal pin as, for example, a hexagonal pin, with a shaft coupling 22 being axially slidable thereon, thereby establishing a rotary connection between the shaft coupling 22 and the shaft end 20.

Mounted in the upper area of the bowl 10 is a disk 24 dividing the bowl into an upper and a lower bowl section 152 and 154, respectively, the disk being connected with the shaft coupling 22 in a vertically displaceable relationship thereto via an adjusting device 74 and serving the function of receiving various shredding or slicing tools 160, 84, 82 or 80, 28 shown in FIG. 1. The shredding or slicing tools 160, 84, 82 or 80, 28 include a shaft 30 having an external tooth arrangement 32, with a mounting structure 36 being pressed or molded thereon, thereby providing for positive engagement between the shaft 30 and the mounting structure 36. A one-piece shredding or slicing blade 39, 37, 35 or 38, 34 is fastened to the upper end of the mounting structure 36, for example, by molding or riveting the mounting structure 36 to the blade. The blades 39, 37, 35 or 38, 34 are substantially crescent-shaped, embracing the shaft 30 in the manner of a ring in the area 41 where they are additionally in positive engagement with the mounting structure 36 by means of the annular collar 43. The mounting structure 36 has a cylindrical flange 40 extending in downward direction when viewing the drawing and including an internal tooth arrangement 42 configured as an elongated toothed member (FIGS. 2 and 3) suitable for relatively non-rotatable engagement between the shredding or slicing tools 160, 84, 82 or 80, 28 and a complementary external tooth arrangement 44 provided on the shaft coupling 22, while at the same time a connection disconnectable axially upwardly is provided between the cylindrical flange 40 of the shredding or slicing tool 160, 84, 82 or 80, 28 and the upper end of the shaft coupling 22.

In FIGS. 1 to 3, the mounting structure 36 is equipped with opposite stop surfaces 50 arranged at relative angles and extending in axial direction, which, on installation of the shredding or slicing tool 160, 84, 82 or 80, 28 in an axial bore 54 provided in the disk, about corresponding stop surfaces 52 provided in the bore 54, thereby equally providing a relatively non-rotatable engagement via an elongated tooth arrangement between the shredding or slicing tool 160, 84, 82 or 80, 28 and the disk 24. In the slicing tools 28, 80 (FIG. 2), there is provided between the opposite stop surfaces 50 a further stop surface 58 having an elongated opening 60 for locking engagement by a pawl 62 of a locking device 64. In the use of a shredding disk 84 as shown in FIG. 3, the axial length of the recess 144 corresponding to the elongated opening 60 of FIG. 2 is dimensioned such that the pawl 62 locks into place without clearance. In this arrangement, the lower abutment stop for the pawl 62 is a radially outwardly extending sheet metal tang 27 molded to the inner area 41 of the shredding tool 84. This tang is omitted in a slicing tool 28 of FIG. 2. The recess 144 is only used with non-adjustable shredding tools 160, 84 and 82.

The locking device 64 is integrated into the carrier disk 24 which is comprised of a horizontally extending circular plate 68 having an opening 70 and an adjusting device 74. With the shredding or slicing tool 160, 84, 82 or 80, 28 in assembled position, the blade 39, 37, 35, 38, 34 will cover the opening 70 to such an extent that in the blade configuration of FIG. 2 only a small slit 72 remains between the blade 34, 38 and the surface 76 of the disk, whereas in the shredding blades 39, 37 and 35 of FIG. 3 the opening 70 is entirely closed so that the processed food can be passed to the lower portion of the bowl 10 only through the shredding holes 78.

In lieu of the slicing tool 28 illustrated in FIG. 2, it is also possible to mount on the disk 24 a cutting tool 80 for cutting french fries or other shredding or slicing tools 160, 84, 82. In FIG. 3, a shredding tool 84 is mounted on the disk 24, with the shredding notches 86 being clearly recognizable. The important point, however, is that the mounting dimensions of all shredding or slicing tools 160, 84, 82 or 80, 28 and their associated mounting structures 36 are configured in such a manner as to be interchangeable depending on their intended use and to be mountable on the disk 24.

As becomes apparent from FIGS. 2 and 3, the disk 24 has on its underside a cylindrical flange 90 which is provided with an internal thread 92 suitable for threading engagement with the external thread 94 of a sleeve 96. The sleeve 96 is part of the adjusting device 74 serving, when turned, to displace the disk 24 axially. The adjusting device 74 is comprised of a cylindrical inner portion 98 and a relatively spaced cylindrical outer portion 100, so that an annular space 102 serving to receive the cylindrical flange 90 of the disk 24 is formed between the two cylindrical portions 98 and 100.

Figure 4:
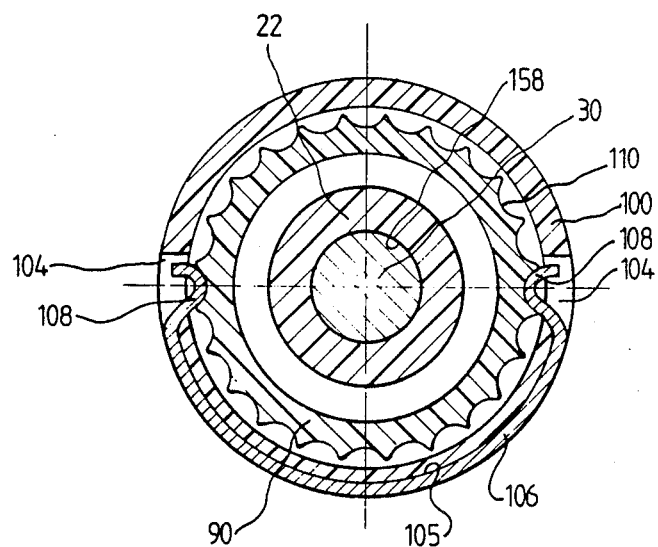
FIG. 4 is a longitudinal section, on an enlarged scale, taken along the line II—II of FIG. 2.

As becomes apparent from FIGS. 2, 3 and 4, an annular groove 105 extending in the cylindrical portion 100 and capable of receiving a locking ring 106 is provided in the upper area of the adjusting device 74. The two opposite ends of the locking ring 106 include noses 108 which, extending through slotted openings 104 provided on the cylindrical portion 100, lockingly engage into locking grooves 110 provided on the outside of the cylindrical flange 90 of the disk 24, thereby producing a corresponding resistance as the adjusting device 74 is turned, which resistance enables the cutting thickness to be adjusted more easily and more noticeably. For example, each locking groove 110 may correspond to one increment indicated by a corresponding mark provided on the cylindrical portion 100 and the disk 24. The locking ring 106 being resilient, it locks itself into place in the two opposite slotted openings 104. When the adjusting device 74 is turned, it will become displaced relative to the cylindrical flange 90 in the axial direction of the shaft 30, with the two noses 108 being guided in the locking grooves 110. The length of the locking grooves 110 corresponds to the maximum operating range of the disk 24 and thus to the maximum clearance between the slicing tool 28, 80 and the surface 76 of the disk 24.

At the lower end of the cylindrical inner portion 98 of the adjusting device 74 shown in FIGS. 2 and 3, the inner surface of the, bore 113 includes a locking ring 114 in the form of annular torus molded thereon which engages into an annular groove 116 provided on the shaft coupling 22. The adjusting device 74 is thereby safely locked or secured in the axial direction of the drive shaft 18, with the adjusting device 74 being rotatable relative to the shaft coupling 22. The annular space 118 provided at the lower end of the sleeve 96 permits the adjusting device 74 to be elastically clipped on the shaft coupling 22. In operation, the adjusting device bears downwardly against the annular collar 119 formed on the shaft coupling 22.

In FIGS. 2 and 3, the pawl 62 of the locking device 64 is mounted adjustably relative to the mounting structure 36 in an elongated quadrangular opening 120 against the action of a spring 122. The elongated opening 120 is provided in the circular plate 68 of the disk 24. The elongated opening 120 serves the function of receiving the pawl 62 and is covered by a plate 124, enabling the pawl 62 to be introduced into the elongated opening 120 radially from the inside.

In FIGS. 2 and 3, the upper end of the pin 30 is received in a bore 130 of a bearing sleeve 131 which is fastened in a recess 133 of a cover 132. The cover 132 closes the bowl 10 from above, securing the pin 30 against axial displacement between the bearing sleeve 131 and the shaft end 20.

For example, if it is desired to change the cutting thickness of the slicing tool 28 of FIG. 2, merely the adjusting device 74 has to be turned and, depending on the direction of rotation, the cylindrical flange 90 of the disk 24 will move out of or into the annular space 102 of the adjusting device 74, thereby reducing or increasing the distance between the slicing tool 28 and the surface 76 of the disk 24 as soon as the arrangement is installed in the bowl 10 and closed by the cover 132. To be able to perform the desired adjustment accurately, graduation marks indicating the respective cutting thicknesses may be provided on the outer surface of the adjusting device 74, for example. By turning the adjusting device 74 for the purpose of reducing the cutting thickness, the disk 24 continues to be adjusted until the lower projection 135 of the recess 112 is in abutment with the nose 108 of the locking ring 106. In FIG. 3, an adjustment of the disk is not possible since it is connected with the shredding tool 82, 84, 160 via the pawl 62.

In FIGS. 2 and 3, the cover 132 is adapted to be firmly seated upon the bowl 10 via a bayonet locking arrangement not shown in the drawing. The upper side of the cover 132 has a feed tube 134 through which the food material to be processed can be directed to the shredding or slicing tool 160, 84, 82 or 80, 28 from the outside.

If, for example, the slicing tool 28 is to be exchanged for another slicing tool 80, the cover 132 is rotated to unlock the bayonet locking arrangement following which the cover 132 has to be merely removed in order to pull the slicing tool 28 together with the mounting structure 36 off the shaft coupling 22 at the shaft end. Another shredding or slicing tool 80, 82, 84, 160 can be subsequently introduced into the bore 158 of the shaft coupling 22 from above. The cover 132 can then be replaced on the bowl 10 from above, with the bore 130 then receiving the upper end of the pin 30.

As becomes apparent from FIG. 2, the annular step 140 of the shaft coupling 22 abuts the end surface of the shaft end 20 of the drive shaft 18 at all times in order to enable the disk 24 to bear against the shaft coupling 2 via the adjusting device 74. By contrast, in the use of shredding disks 82, 86, 160 of FIG. 3, the disk 24 bears against the shaft 30 via the pawl 62 and the mounting structure 36, the shaft 30 abutting at all times the shaft end 20 of the drive shaft 18. With a shredding disk 82, 84, 160 mounted (FIG. 3), turning of the adjusting device 74 permits only the shaft coupling 22 to move upwardly or downwardly depending on the direction of rotation, until the nose 108 abuts the lower or upper projection 135, 138 of the cylindrical flange 90. This prevents any further adjustment of the adjusting device 74.

I claim:

1. A cutting tool arrangement for cutting food material, in particular for domestic appliances, which arrangement is adapted to be fitted in a non-rotatable relationship to a drive shaft extending through the bottom of a bowl comprising
   a shaft coupling, a disk adapted to divide the bowl into an upper and a lower bowl section, said disc having an opening, a cutting tool provided in said opening of said disk, and an adjusting device for adjustment of the position of said disk relative to said cutting tool,
   said adjusting device being rotatably mounted and fixed in axial longitudinal direction on said shaft coupling while at the same time being connected with said disk via coupling structure that includes elongated toothed structure such that said shaft coupling is in driving relation with said disk and said cutting tool via said elongated toothed structure, and that said cutting tool bears against the drive shaft in axial direction and is held in a fixed position relative to said drive shaft while said adjusting device adjusts the position of said disk relative to said cutting tool.

2. An arrangement as claimed in claim 1 and further including a locking device between said disk and said cutting tool, said locking device securing said cutting tool axially relative to said disk, said adjusting device being rotatably mounted, and said disk and said shaft coupling being axially displaceable relative to one another as said adjusting device is turned.

3. An arrangement as claimed in claim 1 or claim 2 wherein said adjusting device is centered on the circumferential outer surface of said shaft coupling, and an annular torus formed on said adjusting device engages into an annular groove provided on said shaft coupling.

4. An arrangement as claimed in claim 1 or claim 2 wherein said adjusting device includes a locking ring secured thereto, said locking ring having at least one radially inwardly extending nose engaging into a recess extending axially on said disk, the length of said axially extending recess corresponds to the maximum amount of axial displacement of said disk.

5. An arrangement as claimed in claim 1 or claim 2 wherein said adjusting device includes a cylindrical inner portion and a relatively spaced cylindrical outer portion, and the annular space formed between the cylindrical portions receives axially slidably a cylindrical flange formed on said disk.

6. An arrangement as claimed in claim 5, wherein said circumferential outer surface of the cylindrical inner portion is provided with a thread which cooperates with a thread formed on the circumferential inner surface of said cylindrical flange provided on said disk.

7. An arrangement as claimed in claim 1 or claim 2 wherein said shaft coupling has at its driving end a polygonal bore which is adapted for seating engagement with the upper end of the drive shaft provided with a corresponding polygon, and said coupling structure includes an elongated toothed portion on the circumferential outer surface of said shaft coupling at its opposite end which is in engagement with a corresponding elongated toothed portion formed on a cylindrical flange on said cutting tool and which permits an axial displacement of said cutting tool relative to said shaft coupling.

8. An arrangement as claimed in claim 1 or claim 2 wherein said cutting tool has an elongated opening which extends in the axial direction of said shaft coupling and a locking device formed in said disk, the length of said axially extending elongated opening corresponding to the maximum amount of axial displacement of said disk.

9. An arrangement as claimed in claim 2 wherein said cutting tool includes a recess, and a locking device carried by said disk, the axial length of said recess being dimensioned such that said locking device engages thereinto without axial clearance.

10. An arrangement as claimed in claim 1 or claim 2 wherein said cutting tool has a shaft extending through its center in positive engagement with said cutting tool, and said shaft is adapted to be held axially immovably between a cover adapted to close the bowl and the upper end of the drive shaft when said cutting tool arrangement is installed inside the bowl.

11. An arrangement as claimed in claim 10 and further including a bearing sleeve provided in said cover, in which sleeve the end of said cutting tool shaft proximate to said cover is rotatably carried, and a central bore in said shaft coupling through which bore said shaft extends and in which bore the driving end of said cutting tool shaft is rotatably carried.

* * * * *